United States Patent [19]

Putman et al.

[11] Patent Number: 4,911,386

[45] Date of Patent: Mar. 27, 1990

[54] MULTIPLE RADIO IN-DASH INSTALLATION KIT

[75] Inventors: Rob R. Putman, Moorpark; Roy Nimpoeno, Northridge; Roger J. Alves, Simi Valley, all of Calif.

[73] Assignee: Scosche Industries, Inc., Simi Valley, Calif.

[21] Appl. No.: 199,797

[22] Filed: May 27, 1988

[51] Int. Cl.⁴ .............................. G12B 9/00
[52] U.S. Cl. ...................... 248/27.1; 248/544; 248/558; 312/7.1; 455/345
[58] Field of Search ............ 248/27.1, 27.3, 544, 248/558, 551, DIG. 9, 298; 312/242, 296, 328, 7.1, 257 A; 455/345

[56] References Cited

U.S. PATENT DOCUMENTS

| | | |
|---|---|---|
| 2,328,421 | 8/1943 | Carlson et al. ............ 248/DIG. 9 X |
| 2,658,704 | 11/1953 | Smith . |
| 2,821,566 | 1/1958 | Wiley . |
| 2,986,627 | 5/1961 | Marriett ........................ 248/298 X |
| 3,297,977 | 1/1967 | Smith . |
| 3,366,727 | 1/1968 | Rueger . |
| 3,799,483 | 3/1974 | Chiappinelli . |
| 3,906,371 | 9/1975 | Tsuji . |
| 3,922,047 | 11/1975 | Tsuji . |
| 4,022,415 | 5/1977 | Roderick et al. ................... 248/298 |
| 4,068,175 | 1/1978 | Maniaci . |
| 4,225,257 | 9/1980 | Andreaggi . |
| 4,226,393 | 10/1980 | Rardin . |
| 4,313,584 | 2/1982 | Fukunaga . |
| 4,462,564 | 7/1984 | Alves et al. . |
| 4,488,206 | 12/1984 | Mizusawa . |
| 4,524,933 | 6/1985 | Rouws . |
| 4,560,124 | 12/1985 | Alves et al. . |
| 4,660,789 | 4/1987 | Putman . |
| 4,699,341 | 10/1987 | Ponticelli ..................... 312/7.1 X |
| 4,738,420 | 4/1988 | Angle et al. .................... 248/27.1 |
| 4,742,978 | 5/1988 | Ponticelli ......................... 312/7.1 |

Primary Examiner—David L. Talbott
Attorney, Agent, or Firm—William W. Haefliger

[57] ABSTRACT

An in-dash radio installation kit, for installing a radio to a vehicle dash, comprises: a box-like molded plastic frame including walls comprising end walls and a main front panel interconnecting the end walls; through openings in certain of the walls to pass fasteners that connect external brackets to the walls; and ribs integral with and outstanding from those certain walls and extending frontwardly and rearwardly toward the openings, whereby corresponding grooves in the brackets may closely interfit the ribs to block twisting of the brackets. The brackets define openings that are registrable with the openings in those certain walls.

16 Claims, 6 Drawing Sheets

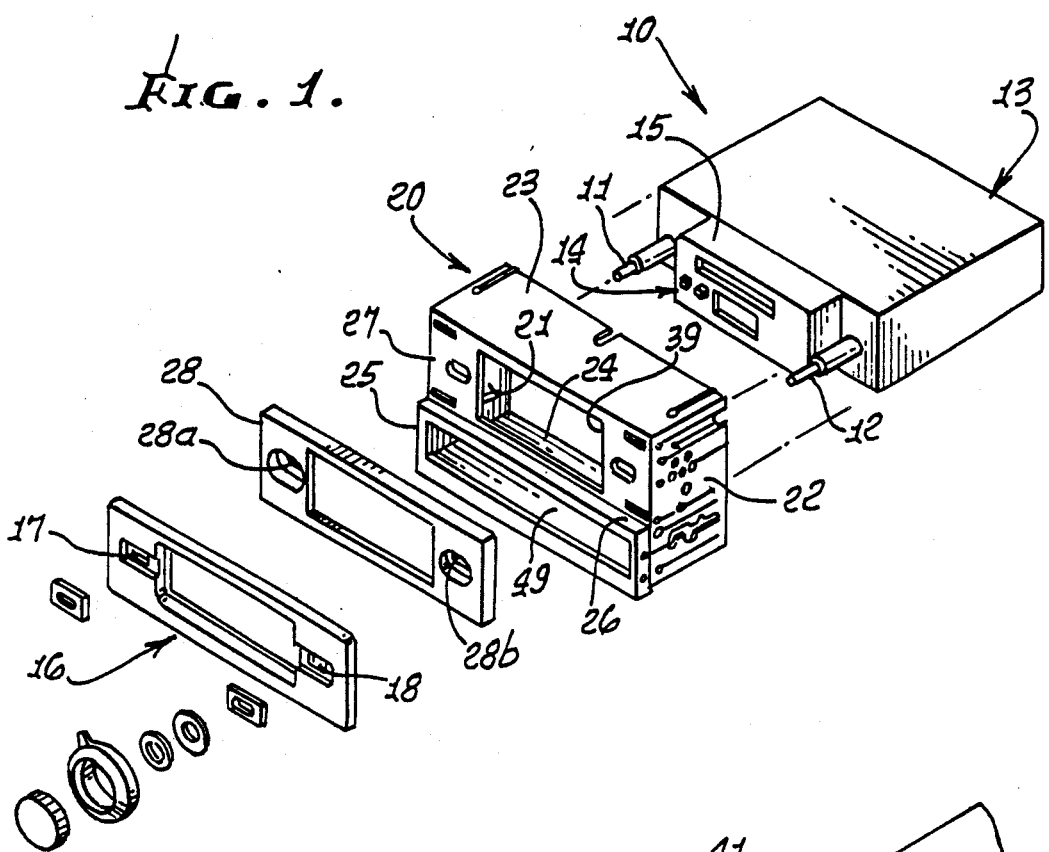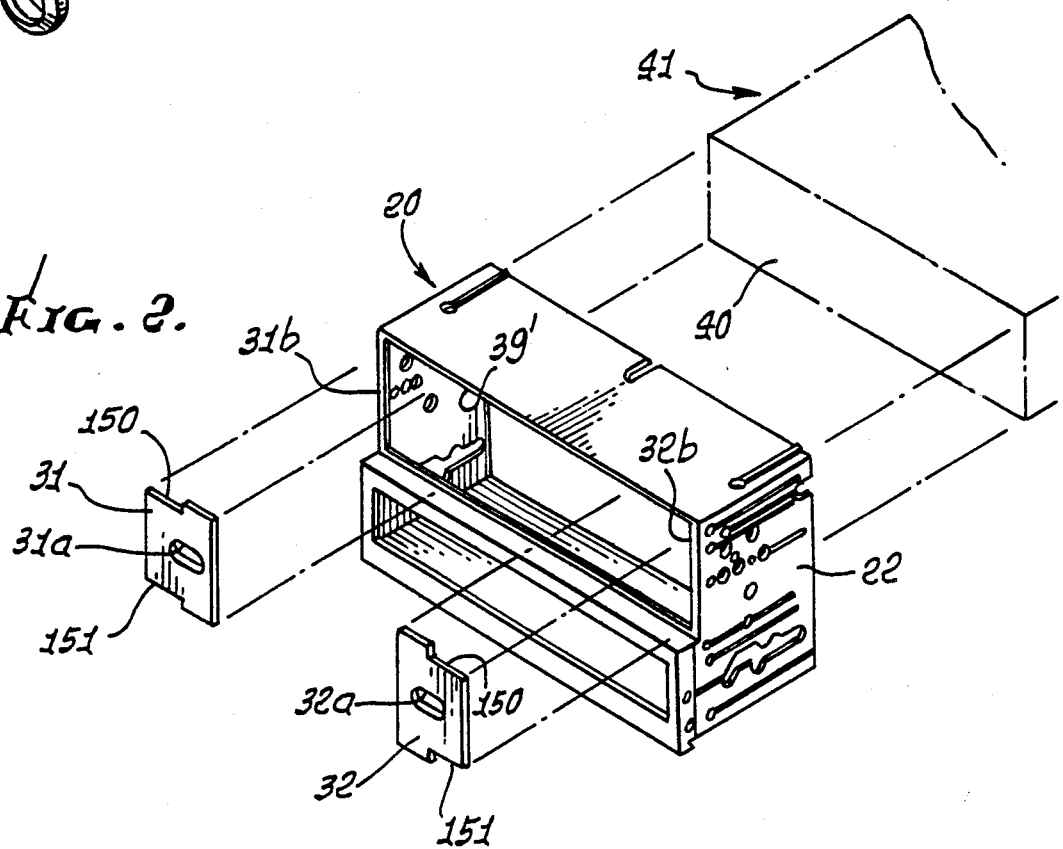

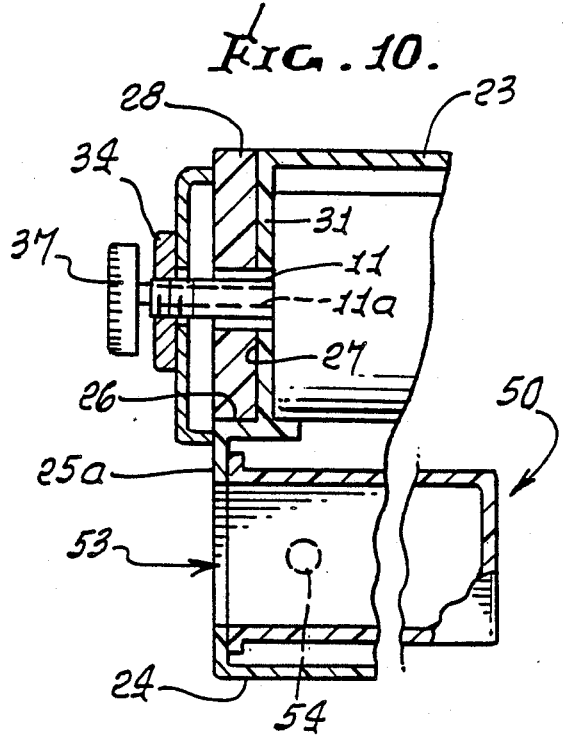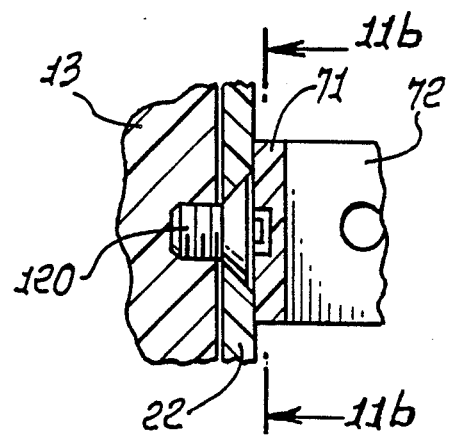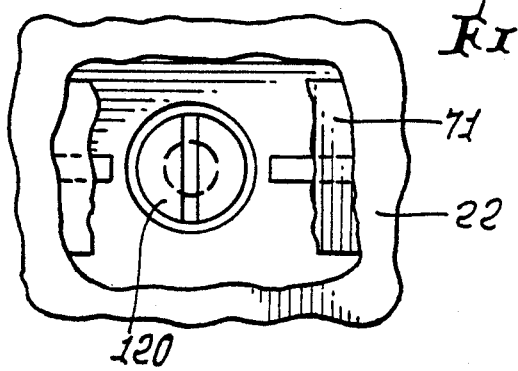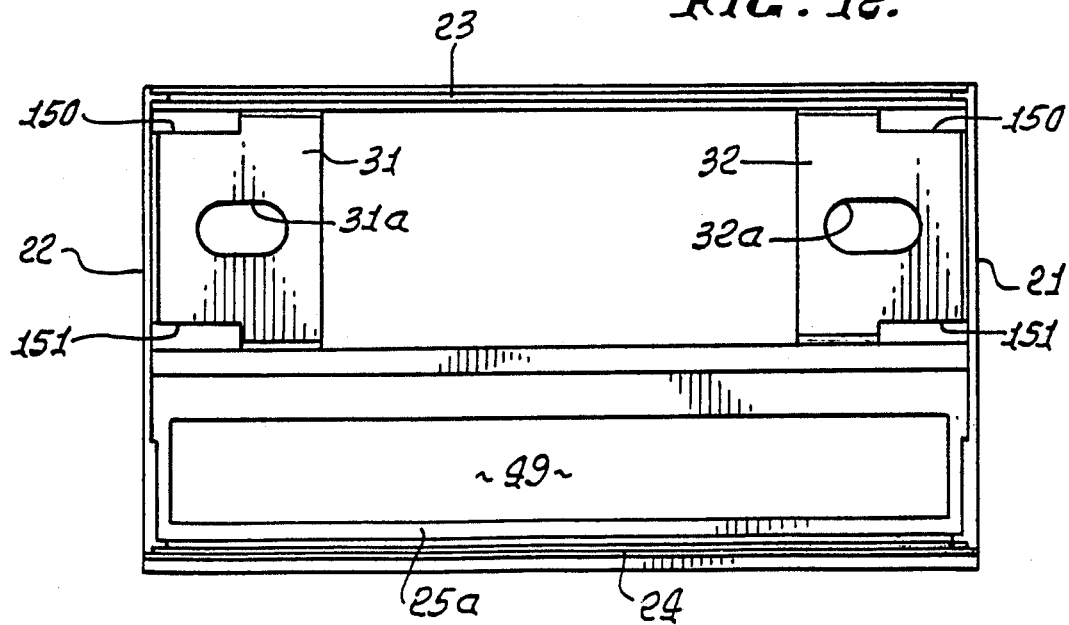

MULTIPLE RADIO IN-DASH INSTALLATION KIT

BACKGROUND OF THE INVENTION

This invention relates to a conversion kit to facilitate the mounting of substitute equipment such as a radio, or equalizer in an automobile instrument panel, such equipment substituted for the original equipment radio.

It has become quite common in the contemporary automobile market for owners to want to substitute for the original equipment radio, (or dummy panel when the car comes equipped without a radio), that is in the car when new, a radio of a different type. Typically, the original equipment radio is mounted to install in a cavity in the instrument panel of the automobile, with a trim frame or panel around the control panel of the radio.

Present day automobiles differ in style and appearance including the size and location of the cavity in which the radio is installed. Conversion kits have been available wherein a frame is inserted into the cavity after the radio. However, a large assortment of different conversion kits is necessary in order to fill the requirements of different automobiles having different instrument panel designs.

Thus, there is a strong need in the art for a conversion kit having the capability of serving its purpose in a large variety of different automobiles, especially to convert to use of a DIN radio and/or equalizer (tone control) chassis.

SUMMARY OF THE INVENTION

It is a major object of the invention to provide a simple yet universal conversion kit, which will meet the above need. Basically, the invention is embodied in a device which comprises:

(a) a box-like molded plastic frame having wall means including relatively thin walls and a main front panel interconnecting the end walls, (b) through openings in certain of said walls to pass fasteners that connect external brackets to the walls, (c) and ribs integral with and outstanding from said certain walls and extending frontwardly and rearwardly toward said openings, whereby corresponding grooves in the brackets may closely interfit the ribs to block twisting of the brackets.

As will be seen, the main front panel typically has a front face, and break-away means may be provided to comprise a thin wall or walls generally parallel to said front face but offset sidewardly and rearwardly relative thereto.

It is another object of the invention to provide a front sub-panel overlying the break-away means and having a front face substantially flush with the front face of the main front panel, the sub-panel also forming forward through openings in shaft passing registration with the through openings in the break-away means, the sub-panel rearwardly carried by the frame.

Another object is to provide on the front panel a step shoulder below the sub-panel, said front panel defining a generally rectangular through opening for registration with an auxiliary frame, said rectangular through opening located below said step shoulder. In this regard, the auxiliary frame may be defined by one of the following:

(a) a radio equalizer chassis
(b) a storage compartment.

It is a further object to provide the end walls of the frame with multiple forwardly and rearwardly extending ribs that interfit bracket grooves, as described, the ribs extending toward differently positioned openings through such walls. Accordingly, brackets can be selectively positioned on different ribs and with bracket openings registered over selected openings in the walls, to interfit and connect different vehicle dash structures. Provision is made for flush mounting of the radio chassis in the frame, as by drawing the fasteners into the end wall structure during fastener tightening. Certain fasteners connect only to the frame walls, and other fasteners connect to the chassis, within the frame, as will be described. Also, the brackets can extend to the top or bottom wall of the frame.

The invention is especially adapted to mounting DIN radios to Toyota vehicles, and as replacements for radios in such vehicles.

These and other objects and advantages of the invention, as well as the details of an illustrative embodiment, will be more fully understood from the following specification and drawings, in which:

DRAWING DESCRIPTION

FIG. 1 is an exploded perspective view showing use of the box-like frame and sub-panel means of the invention for reception of one type radio, and with break-away means in place;

FIG. 2 is a perspective view of the frame after removal of the break-away means, for reception of a DIN radio;

FIG. 10 is a vertical section showing the frame front panel and multiple chassis attachment;

FIG. 11a is a section showing fastener attachment of the frame thin wall to a radio chassis;

FIG. 11b is a side elevation on lines 11b–11b of FIG. 11a;

FIG. 12 is a rear elevational view of the frame or housing that incorporates the invention:

FIG. 14b is an end view of the bracket seen in FIG. 14a.

DETAILED DESCRIPTION

Figure 3:
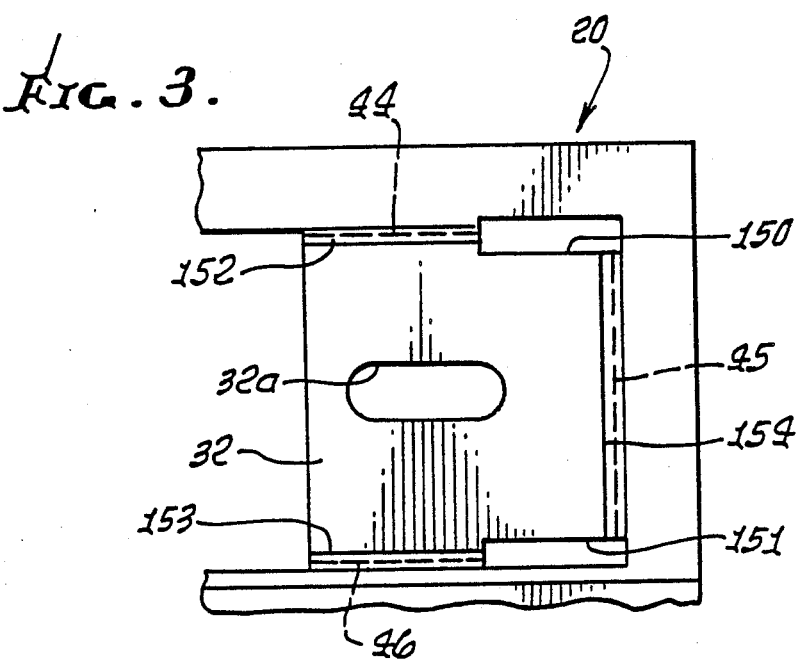
FIG. 3 is a front elevation showing outline shape of the DIN radio related to an enlarged front panel opening of the box frame.

The assembly seen in FIG. 1 includes a vehicle dash mounted radio 10 (Toyota, for example) having tuning (station selection and volume control) shafts 11 and 12 projecting forwardly from the chassis 13, and at opposite ends of instruments 14 contained in a reduced size rectangular sub-housing 15.

The radio normally has a removable face plate 16 provided with shaft-passing openings 17 and 18.

In accordance with the invention, a box-like, molded plastic housing or frame 20 is provided, and is rearwardly open for reception into the frame of the forward extent of chassis 13. The frame has wall means including upright relatively thin end walls 21 and 22, top and bottom walls 23 and 24, and a main front panel 25 interconnecting the walls 21–24, by integral molding to the forward ends of such walls. See panel 25 in FIGS. 10 and 12.

Extending the description to FIG. 10, the front panel 25 has a narrow, horizontally elongated step shoulder 26 below and forwardly of an upright front face 27. A sub-panel 28 fits in the space directly above the shoulder 26 and directly forward of the front face 27, the sub-panel extending lengthwise to sub-tend the forward edges of end walls 21 and 22. The width of the sub-panel equals the width of shoulder 26 so that it together with the frame form a block shape.

The housing also includes plastic break-away means, such as thin sub-walls 31 and 32 integral with the housing and associated with the front panel. The sub-walls are located directly rearwardly of the sub-panel. The thin sub-walls form through openings 31a and 32a in registration with through openings 28a and 28b, in sub-panel 28 and also in registration with face plate openings 17 and 18 for passing the tuning shafts 11 and 12. FIG. 10 shows sub-panel 28 held in position against the sub-walls 31 and 32 as by the face plate 16. The latter is in turn clamped rightwardly by the nuts 34 threaded on shafts 11 and 12; and a tuning knob 37 presses on the end of a rotary inner shaft 11a passing through outer shaft 11 to a variable impedance (such as a variable capacitor) within chassis 13. The front face of sub-panel 28 is then flush with the front surface 25a of the main front panel, below sub-panel 28.

The break-away means such as sub-walls 31 and 32 are shown as broken away along edges 31b and 32b, in FIG. 2, whereby the front opening in the main front panel is enlarged as at 39'. (The opening is reduced at 39 in FIG. 1, to fittingly accept the sub-housing 15 of chassis 13). Relieved upper and lower edges 150 and 151 of each sub-wall assist such break-away. In FIG. 2, the enlarged opening fittingly accepts or registers with the larger chassis 40 of a DIN radio 41. Also, the DIN radio chassis typically projects through opening 39' and over the ledge or step shoulder 26; and sub-panel 28 is then not employed, i.e. it is removed along with break-out walls 31 and 32. A DIN radio panel or plate is then substituted for 28.

FIG. 3 shows the edge outline at 44–46 of the DIN radio chassis 40 as related to the break-out wall 32, looking forwardly relative to housing 13, and prior to break-out of those walls or sub-panels 31 and 32. The thin plastic sub-panels have certain relieved edges 150 and 151 proximate but spaced from the frame walls, and other edges 152–154 integral with the frame.

Figure 5:
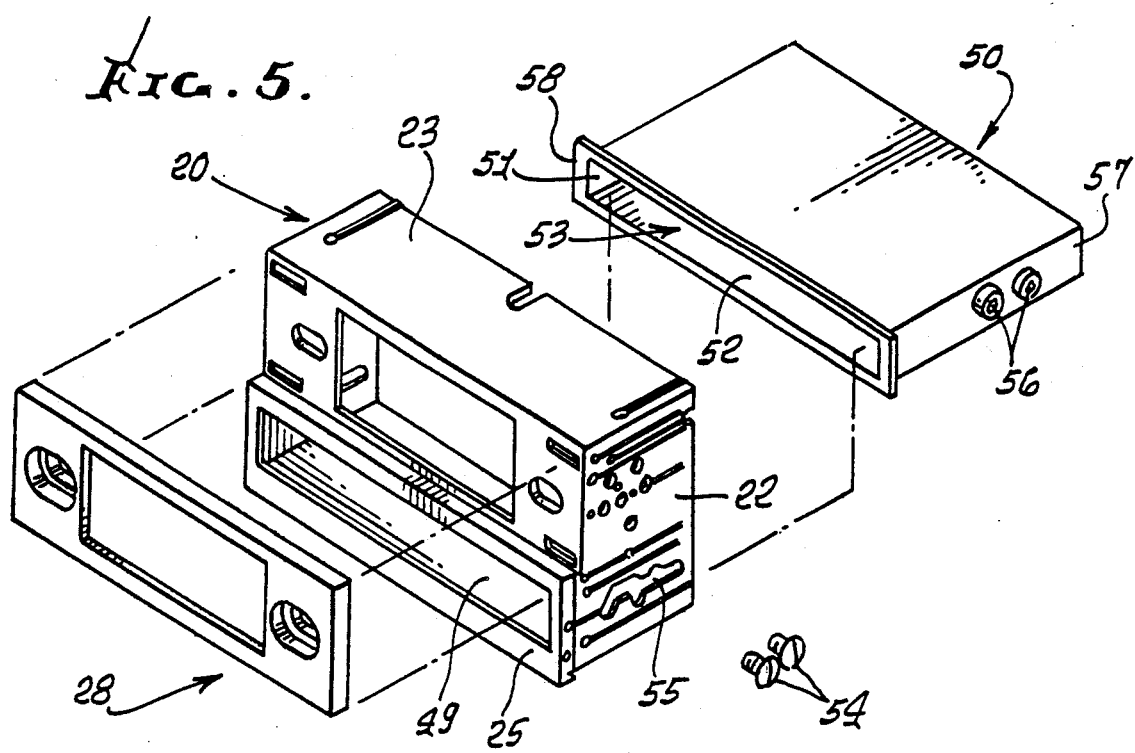
FIG. 5 is a view like FIG. 4 wherein a pocket or storage is alternately receivable by the frame.
Figure 6:
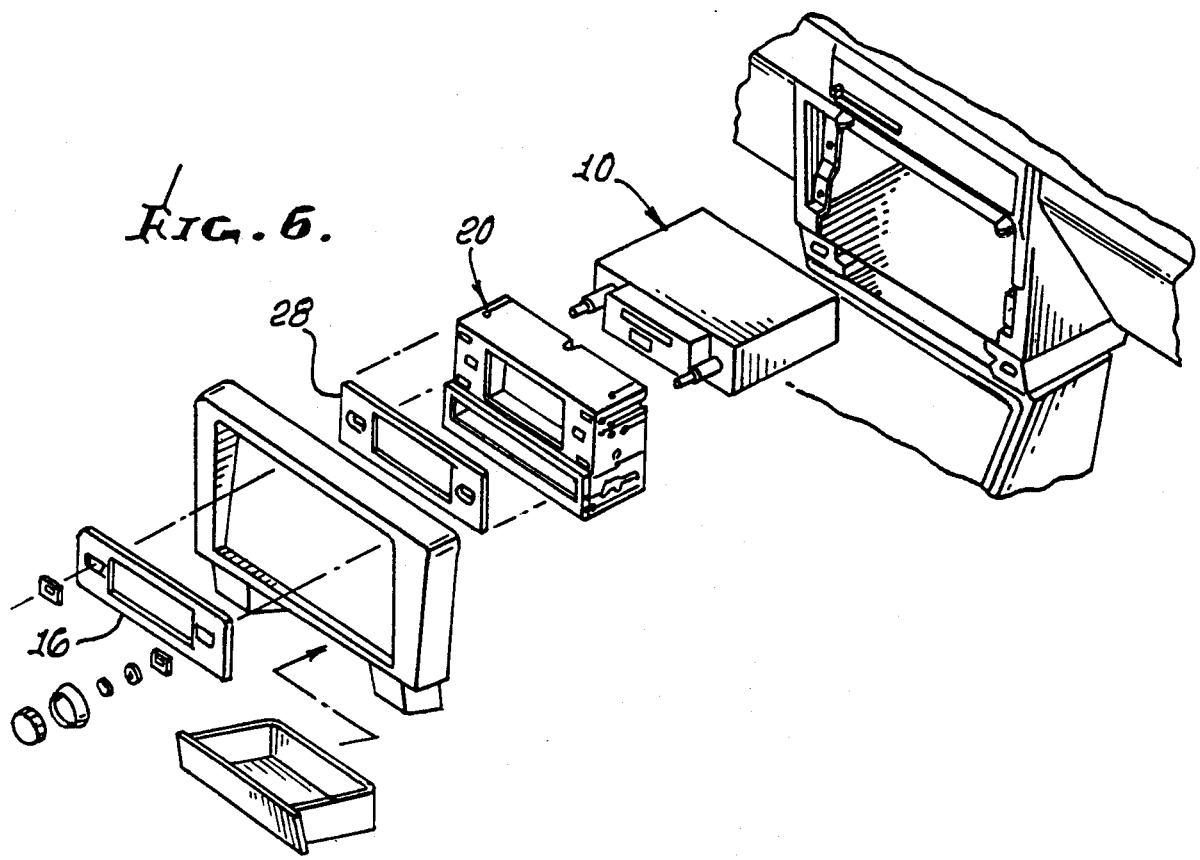
FIG. 6 is a view like FIG. 1, showing application to a dash replacement installation.

The front panel 25 also defines a generally rectangular through (access) opening 49 for registration with an auxiliary frame. In FIGS. 5 and 10 the auxiliary frame comprises a pocket or receptacle 50 which opens frontwardly at 51, so as to be manually accessible at 53 to the user, for storage of small articles (keys, pencils, etc.) at 52. A fastener or fasteners 54 project through openings 55 in the housing end walls and into openings 56 in the walls at 57 of the receptacle 50, to retain it in position. Note peripheral flange 58 at the interior mouth of the receptacle to seat against the panel 25.

Figure 4:
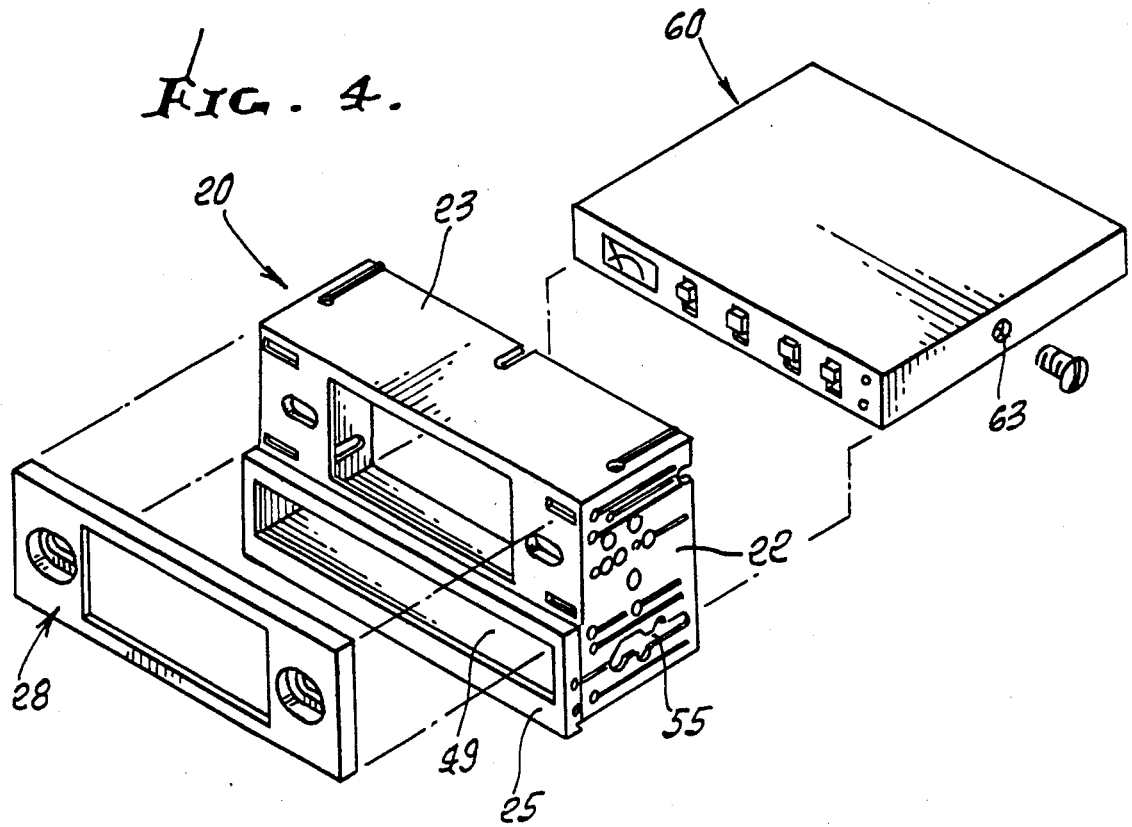
FIG. 4 is an exploded perspective view showing provision by the frame for simultaneous reception of an auxiliary circuit chassis such as an equalizer (tone control) chassis.

Alternatively, and as seen in FIG. 4, an equalizer chassis 60 registers with opening 49, and the front (instrument) face 61 of that chassis may project into or through the rectangular access opening 49. Again, fasteners extend through openings in the frame end walls and into openings 63 in the side walls of chassis 60, to retain it in position. Such fastener comprises tightenable, threaded fasteners.

Figure 7:
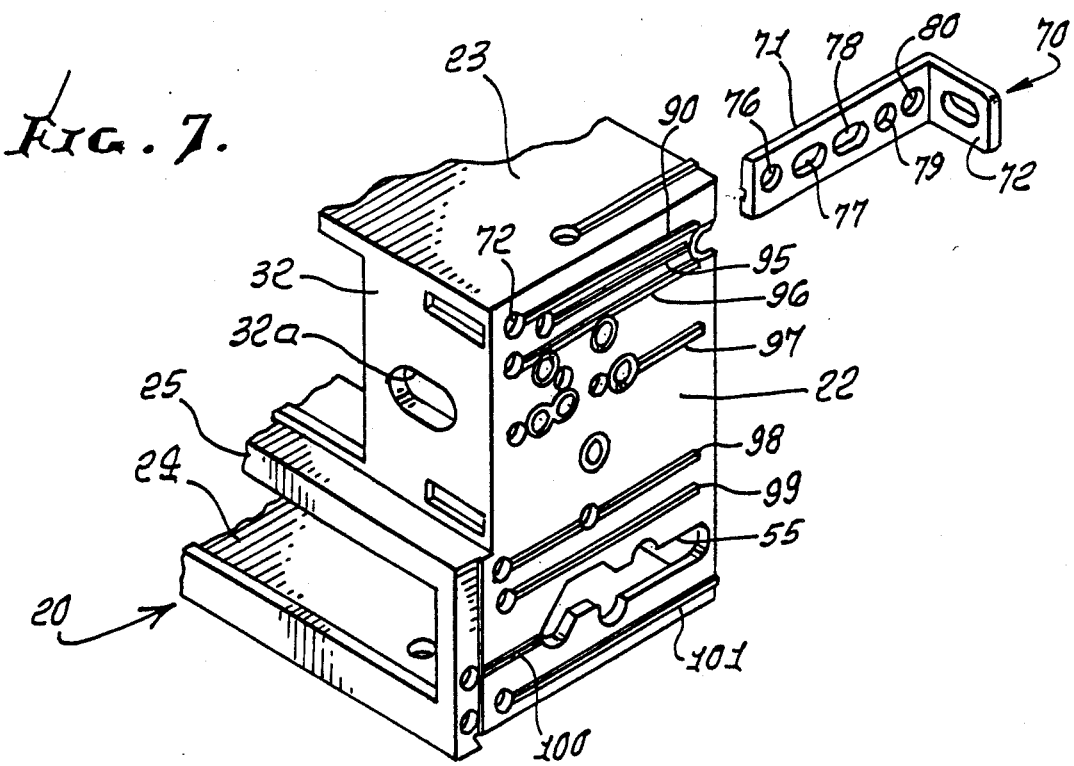
FIG. 7 is a fragmentrary exploded view showing a mounting brackets selectively attachable to a frame end wall.
Figure 8:
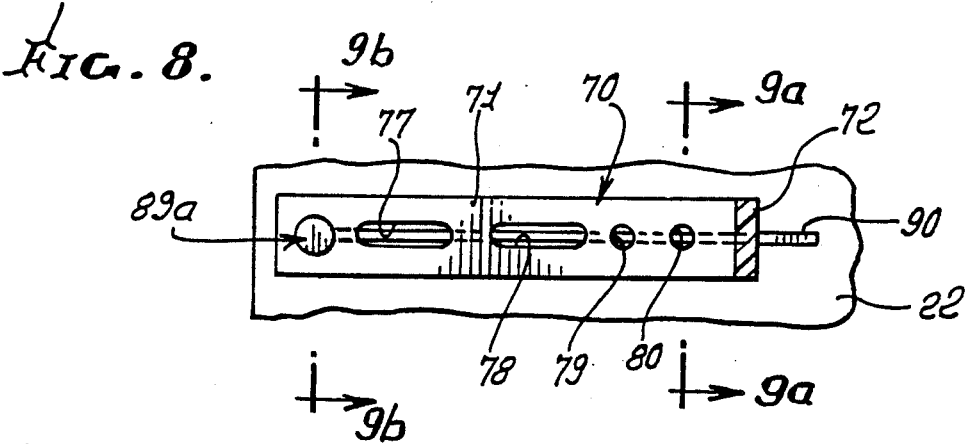
FIG. 8 is a section showing bracket reception and slidable and guidance upon an end wall rail.

FIGS. 7 and 8 shows the provision of an L-shaped bracket 70 usable to connect the frame or housing 20 to the dash structure. Bracket leg 71 is adjustably attachable to end wall 22, and to the chassis 13, as via one of the openings 72–101a in that wall, adjustably registrable with one of the through openings 76–80 in leg 71. A stud or threaded fastener 88 attaches through the registered openings.

Figure 9A:
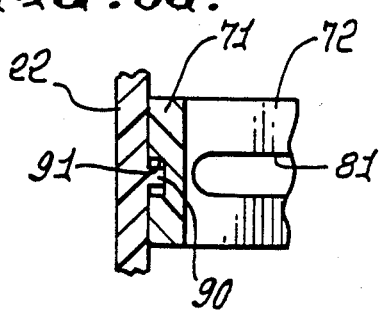
FIG. 9a is a section on lines 9a–9a of FIG. 8.
Figure 9B:
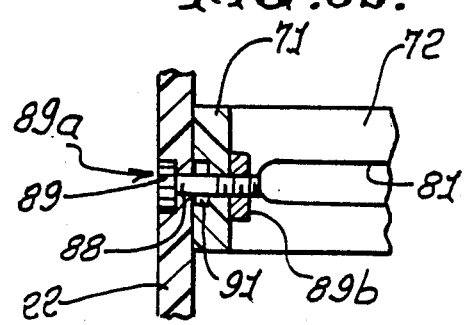
FIG. 9b is a section on lines 9b–9b of FIG. 8.

As seen in FIG. 9b, the fasteners 88 typically have axially extending ribs 89 on heads 89a and which press into the end walls, upon tightening of nuts 89b to prevent or block fastener rotation. End walls 21 and 22 typically have thickness less than 1/16 inch, such fastener ribs being effective despite such extreme thinness of the walls.

Leg 72 of the bracket attaches via a fastener and opening 81, to dash structure. A similar bracket is employed at the opposite end of the housing, i.e. next to wall 21.

FIGS. 7, 8 and 9a show the endwise guidance of such a bracket leg 71 by forwardly and rearwardly extending rail 90 projecting outwardly form the end wall 22 of the housing. An elongated groove 91 sunk in leg 71 closely receive that guide rail. Such a rail also prevents twisting of the bracket leg 71, under torque load, relative to the housing. FIGS. 11a and 11b show fastener 120 attachment of wall 22 to chassis 13. Leg 71 is broken away in FIG. 11b.

Figure 13:
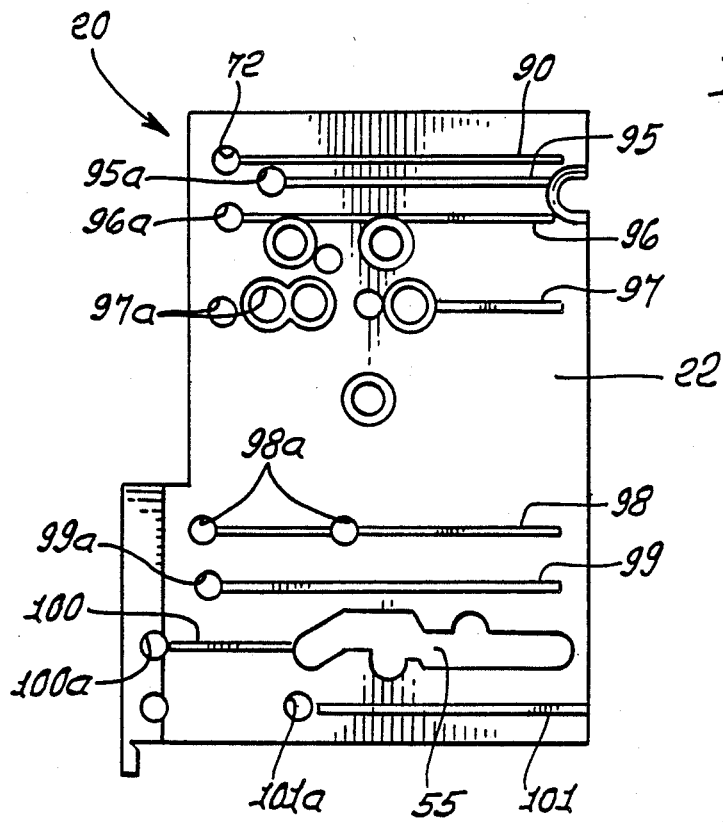
FIG. 13 is a side elevational view of the FIG. 12 frame.

FIGS. 12 and 13 are more detailed views of the housing or frame 20; and FIG. 13 shows the location of openings in the end wall 22 for reception of fasteners. Ribs or rails 95–101 extend outwardly from the end walls 21 and 22 and toward corresponding openings 95a–101a. Bracket legs like leg 71 are adapted to interfit such ribs, in the same manner as described above for leg 71 and rib 90, to prevent twisting of such brackets. The brackets used are different, for different vehicle models having different dash structure configuration to which bracket legs (such as leg 72) attach. The different holes 95a–101a correspond such different brackets used for different vehicles.

Figure 14B:
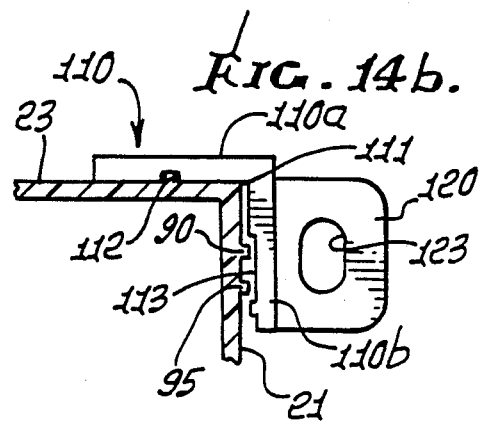
Figure 14A:
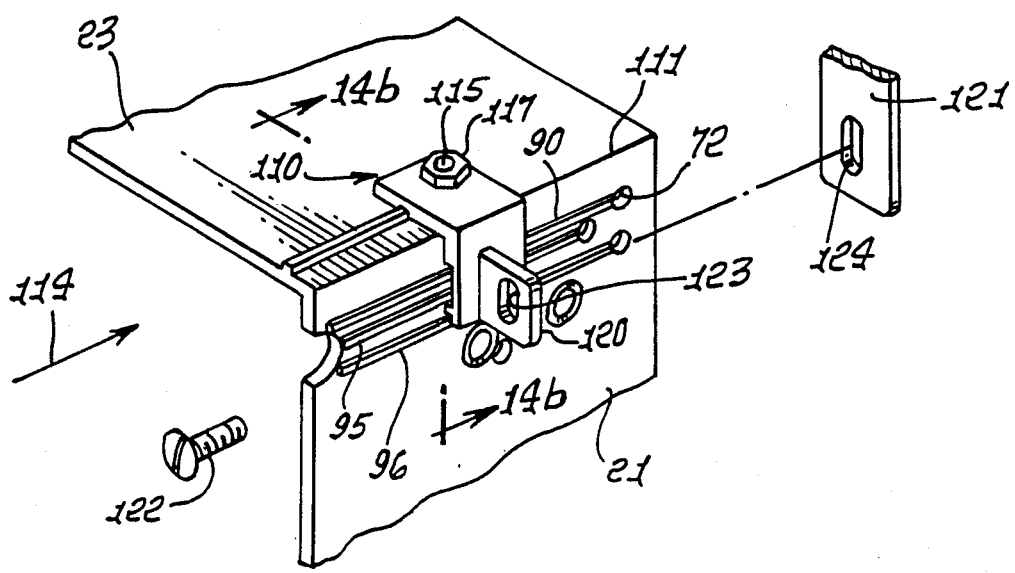
FIG. 14a is a perspective view of a corner of the frame, and a mounting bracket.

FIGS. 14a and 14b show an L-shaped bracket 110 having legs 110a and 110b fitting the upper corner 111 of the frame. Leg 110a is grooved at 112 to closely fit guide (and twist resisting) rib 112a on the top wall 23, and leg 110b is grooved at 113 to span and closely fit guide (and twist resisting) rib 90 and 95 on the side wall 21. The bracket may be shifted forwardly (in arrow direction 114) until an opening in the leg 110a registers over a corresponding opening on top wall 23, and a fastener 115 may then be attached in the same manner as shown in FIG. 9b. Nut 117 tightens down on the threaded shank of the fastener and a ribbed nut (like nut 89a) enters and attaches to the inner side of wall 23, as in FIG. 9b. A flange 120 intergral with leg 110b projects outwardly for attachment to representative dash structure indicated at 121 in FIG. 14a, as via a fastener 122, and openings 123 and 124, as shown.

All parts, except the fasteners, typically consists of molded plastic material.

We claim:

1. In an in-dash radio installation kit, for installing a radio chassis to a vehicle dash, the improvement comprising:
    (a) a box-like molded plastic frame having wall means including walls comprising end walls and a main front panel interconnecting the end walls,
    (b) through openings in certain of said walls to pass fasteners that connect external brackets to the walls, and including said brackets carried by the frame and having legs defining openings that register with said openings in said certain walls, at least two brackets having elongated legs defining elongated re-entrant grooves,
    (c) and ribs integral with and outstanding from said certain walls to project in parallel relation and extending frontwardly and rearwardly toward and in alignment with said openings, corresponding grooves in the brackets closely interfitting said ribs to block twisting of the brackets,
    (d) and including other fasteners attaching the walls to a radio chassis, and including said radio chassis.

2. The improvement of claim 1 including forwardly facing break-away means integral with the frame and associated with the front main panel, said break-away means forming forward through openings to pass shaft tuning means of a first radio having a chassis, the break-away means adapted to be broken away from the frame to provide a relatively large opening for alternate reception of a second radio chassis.

3. The improvement of claim 2 wherein the main front panel has a front face, and said break-away means comprises a thin wall or walls generally parallel to said front face but offset sidewardly and rearwardly relative thereto.

4. The improvement of claim 3 including a front sub-panel overlying said break-away means and having a front face substantially flush with the front face of the main front panel, the sub-panel also forming forward through openings in shaft passing registration with the through openings in the break-away means, the sub-panel rearwardly carried by the frame.

5. The improvement of claim 4 wherein said front panel defines a step shoulder below the sub-panel, said front panel defining a generally rectangular through opening for registration with an auxiliary frame, said rectangular through opening located below said step shoulder.

6. The improvement of claim 5 including said auxiliary frame which is defined by one of the following:
    (a) a radio equalizer chassis
    (b) a storage compartment.

7. The improvement of claim 3 wherein the main front panel defines a generally rectangular through opening for alternate reception of:
    (a) a radio equalizer chassis
    (b) a molded plastic pocket.

8. The improvement of claim 2 wherein the break-away means comprise two thin sub-panels with certain relieved edges proximate the frame wall means and other edges integral with the frame wall means.

9. The improvement of claim 2 including said first radio at least partly received by the frame, the shaft tuning means comprising two shafts passing through the openings in said break-away walls.

10. The combination of claim 1 including said fasteners associated with said walls for attaching the walls selectively to one of a multiplicity of different first radio chassis, each wall defining a multiplicity of said through openings.

11. The combination of claim 10 wherein said fasteners comprise threaded fasteners.

12. The combination of claim 1 wherein said brackets includes two L-shaped brackets, each having a first leg adjustably attached to one of said walls which is an end wall.

13. The combination of claim 1 including said fasteners which have ribs pressed into the walls about fastener openings therein, for preventing rotation of the fasteners.

14. The combination of claim 13 wherein the walls have thickness less than 1/16 inch.

15. The improvement of claim 1 including said ribs and openings in both end and top walls defined by the frame.

16. The improvement of claim 15 including a corner bracket having arms overlapping the end and top walls of the frame, each arm defining at least one groove receiving at least one rib on the frame, the bracket having structure to attach to a vehicle dash.

* * * * *